United States Patent [19]
Gilmour et al.

[11] 4,064,071
[45] Dec. 20, 1977

[54] PROCESS FOR AGGLOMERATING EXPANDED PERLITE FINES

[75] Inventors: John B. Gilmour, Whittier; Praful K. A. Mehta, Lomita; Melvin J. Mirliss, Long Beach; Richard B. Nielsen, Los Angeles, all of Calif.

[73] Assignee: General Refractories Company, Bala Cynwyd, Pa.

[21] Appl. No.: 700,553

[22] Filed: June 28, 1976

[51] Int. Cl.$^2$ ............................................. B01J 21/12
[52] U.S. Cl. ......................... 252/455 R; 106/DIG. 5; 264/117
[58] Field of Search ......................... 252/378, 455 R; 264/117, DIG. 51; 106/40, 75, DIG. 5

[56] References Cited

U.S. PATENT DOCUMENTS

| | | | |
|---|---|---|---|
| 2,995,773 | 8/1961 | Gidlow et al. | 264/DIG. 51 |
| 3,427,127 | 2/1969 | McCollum | 252/378 R |
| 3,441,515 | 4/1969 | Oshida et al. | 252/455 R |
| 3,619,435 | 11/1971 | Kepper | 106/40 |
| 3,887,671 | 6/1975 | Metzger | 264/117 |

*Primary Examiner*—Winston A. Douglas
*Assistant Examiner*—P. E. Konopka
*Attorney, Agent, or Firm*—Fidelman, Wolffe & Waldron

[57] ABSTRACT

Expanded lightly milled perlite fines are mixed with aqueous alkali metal silicates and the wet mixture is dried at temperatures of from 600° F up to 1400° F in a moving air stream to form agglomerates which are useful as filteraids. The agglomerates may be heat treated in an indirect fired rotary kiln to further reduce the water solubility, and may be separated into size factions either before or after the heat treatment.

6 Claims, No Drawings

PROCESS FOR AGGLOMERATING EXPANDED PERLITE FINES

RELATED APPLICATIONS

This invention is related to copending application Ser. No. 688,462 filed May 20, 1976 by Melvin J. Mirliss and Richard B. Nielsen who are joint inventors in the present invention. The said application is directed to a method and apparatus for drying and/or sintering damp powders which may be employed in the invention described and claimed herein.

FIELD OF THE INVENTION

This invention pertains to filteraids prepared from perlite and is particularly directed to a process for agglomerating expanded, milled perlite particles to produce very fast flow rate filteraids.

DESCRIPTION OF THE PRIOR ART

U.S. Pat. No. 3,441,515 to Oshida et al and assigned to Grefco, Inc., and which is incorporated by reference, describes a method for preparing filteraids from perlite by wetting particles of perlite with alkali metal silicate solution, heating the mass to drive off the solvent and breaking up the weak agglomerates. If desired, further heating at a higher temperature may be resorted to lessen water solubility.

A review of the prior art relating to the preparation of filteraid from expanded perlite is of given in U.S. Pat. No. 3,441,515. Specifically discussed therein are U.S. Pat. Nos. 2,501,962, 2,621,160, 2,665,813, and British Patent No. 791,993, and these need not be further elaborated on herein.

U.S. Pat. No. 3,235,635, likewise discussed with the other prior art patents in U.S. Pat. No. 3,441,515, discloses mixing a finely divided perlite material with a liquid, with or without a fluxing agent, to coalesce the perlite particles. The wetted product is then calcined to effect sintering of the perlite particles, thereby increasing the flow rate of the product. After the calcination step, the product may be milled and classified. However, it has been found in practice that calcination of the wet material by methods suggested in the above-mentioned U.S. Pat. No. 3,235,635 presents troublesome problems in that severe clinkering, and fusion of the product to the calciner wall occurs.

SUMMARY OF THE INVENTION

In accordance with the process of this invention perlite filter aid fines are mixed with about 5% by weight of an aqueous solution of an alkali metal silicate. The resultant mix is then dried in a moving air stream at from about 600° F to about 1400° F. This acts to cure or set the agglomerates. Thereafter these are classified in a conventional manner in an air separator to remove any coarse grit particles.

If an increase in water insolubility of the product is desired, or if it is desired to further sinter the agglomerates to further strengthen the particle to particle bond, the unclassified agglomerates produced in the drying step are heat treated in an indirect fired rotary kiln at a temperature of from about 1100° F to about 1500° F. Unlike prior art no clinkers are formed using this technique.

Accordingly, it is a principal object of the present invention to provide a relatively simple and trouble-free method for preparing perlite filteraids which does not result in the formation of clinkers or the fusion of material to the walls of a kiln, and which results in a filteraid having high flow rate characteristics and good clarifying characteristics.

It is a further object of this invention to prepare a superior perlite filteraid by mixing perlite fines with an aqueous alkali silicate solution and drying the mixture in a hot moving air stream.

It is a further object of this invention to classify the agglomerates produced by the drying step according to size.

It is another object of this invention to heat treat the agglomerates produced by the drying step to increase their water insolubility.

Further objects will become apparent from the following specification and claims:

DESCRIPTION OF THE INVENTION

Perlite fines or perlite filteraids, are treated with an alkali metal silicate to form a moisturized mass. Perlite materials which may be employed in the process are perlite fines; perlite filteraids, such as Dicalite ® 436, manufactured by the Dicalite Division of Grefco, Inc., and having a mean particle diameter of 25 microns; perlite material somewhat larger, such as Dicalite ® 476 and 4106 having mean particle diameters of 26 and 45, respectively, may be employed. While the generally preferred alkali metal silicate is sodium silicate for reasons of cost, other alkali metal silicates may be employed if desired.

An aqueous solution of the alkali metal silicate from 1% to 50% by weight of silicate is thoroughly mixed with the perlite to form a mixture containing perlite: silicate: water ranging broadly from 100:1:5 to 100:10:100, the silicate being on a dry basis. A preferred range of perlite: silicate: water is 100:2:15 to 100:8:50.

Thereafter the wet mixture is fed into a moving gas stream dryer at from 600° F to 1400° F, wherein agglomerates are formed which are suspended in the gas stream during the drying process. The apparatus described and claimed in the copending application Ser. No. 688,462 may be efficiently employed in this step, although other means which would dry the agglomerate while in suspension may be similarly useful. By drying the agglomerates while in suspension in the hot gas stream, which serves to "set" or "cure" the agglomerates, the formation of clinkers and the fusion of material on the walls of the dryer are avoided.

After the agglomerates are cured, the product may be classified by any conventional means, such as an air separator, to remove coarse grit and to provide various fractions exhibiting a range of filtration characteristics. If an increase in water insolubility is desired, the dried unclassified material produced by the drying step can be heat treated by indirect firing, again without the formation of clinkers or fusion of the material to the walls of the dryer, to further insolubilize the alkali metal silicate. Thereafter, the heat treated material can be classified similarly as set forth in connection with the dried agglomerates to provide a number of fractions.

EXAMPLE I 25 pounds of Dicalite ® 436 having a mean particle diameter of approximately 23 microns was added to a cement mixer. While mixing, the perlite mass was sprayed with 1512 grams of sodium solution * in 3,030 grams of water over a period of minutes. The resulting mix contained 100 parts perlite, 35 parts water and 5 parts sodium silicate solids. Thereafter the mix was removed from the cement mixer and fed to a damp-powder dryer at 800° F in order to remove free moisture and "cure" or "set" the agglomerates while suspended in a moving gas stream. The product yield was 96%. The collected material was then classified in a conventional air separator to remove about 2% of the material as coarse grit. The process was repeated with increased drying temperatures at increments of 100° F, and the collected final products were tested for filteraid characteristics, with the result as shown in Table I:; * "N ®" brand sodium silicate solution, a product of the Philadelphia Quartz Co., having a weight ratio of $SiO_2$/$Na_2O$ of 3.22 and containing 8.90 weight % $Na_2O$ and 28.7 weight % $SiO_2$.

As is apparent from this table, each sample starting at 800° F exhibited filteraid characteristics substantially better than either the starting material or a typical fast flow rate perlite product, as shown by the increase in the permeability flow ratio and the decrease of the PCD. The last column in the table shows the agglomation achieved in the process. It will be noted that the flow increased from 800° F to 900° F and then leveled off, and that water insolubility increased at the higher temperatures. At 1,400° F and above the perlite began to melt and build up on the walls of the drying equipment. These higher temperatures are therefore unsuitable.

EXAMPLE II

To further insolubilize the sodium silicate, the dried unclassified material of Example I was heat treated in an indirect fired rotary kiln at 200° F increments from 1100° F to 1500° F with the results as shown in Table II.

The data in Table II shows that heat treatment at temperatures of 1100° F to 1300° F further reduces the products water solubility to less than 0.1% making it competitive with perlite filteraids or flux-calcined diatomite filteraids.

EXAMPLE III

The product from Example I recovered from the drying operation at 1300° F was separated into a fine and a coarse fraction by air separation. The data in Table III shows that the coarse fraction had a remarkably high flow rate characteristic for a perlite filteraid and was competitive with commercial higher flow rate diatomite filteraids. It was far superior in flowrate to presently available perlite filteraids and to the starting material.

The fine fraction, while not equal to the coarse fraction in flowrate characteristics, was nevertheless significantly superior to the original starting material.

The process of Example I was carried out using perlite starting materials other than Dicalite 436. Dicalite 476, a perlite filteraid having a mean particle diameter of 26 microns, and Dicalite 4106 with a mean particle diameter of 45 microns were mixed in separate runs with sodium silicate as shown in Example I. The mixtures were then dried in a moving gas stream at 1300° F and air classified to remove grit.

Table IV shows that improved results are achieved, although the degree of improvement is less in this case because of the larger size of the starting material.

TABLE I

SODIUM SILICATE COATED FILTERAIDS (1)

| Dicalite brand Perlite filteraid | Dryer Temp. ° F | % Yield | PFR (4) | PCD (5) | % Water Solubility | Mean Particle (3) Size, μ |
|---|---|---|---|---|---|---|
| 436 starting material | — | — | 55 | 15.6 | 0.03 | 23 |
| 436 + 5%N® (6) | 800° | 94 | 153 | 13.9 | 0.59 | 34 |
| " | 900° | 97 | 188 | 12.7 | 0.57 | 37 |
| " | 1000° | 98 | 189 | 12.7 | 0.37 | 36 |
| " | 1100° | 99 | 188 | 12.7 | 0.28 | 35 |
| " | 1200° | 98 | 186 | 13.1 | 0.20 | 36 |
| " | 1300° | 94 | 186 | 13.1 | 0.10 | 37 |
| " | 1400° | 43 (2) | 179 | 13.6 | 0.08 | — |
| 4156 (commercial high flowrate Perlite filteraid) | — | | 125 | 14.5 | 0.06 | 44 |

(1) Damp powder dried and air classified to remove coarse grit.
(2) Build-up on dryer walls.
(3) Determined by Coulter Counter
(4) Permeability flow ratio; see patent 3,44,515 incorporated herein by reference.
(5) Permeability cake density, or wet density of the filtercake in lbs./cu. ft. as it appears on the filter. Smaller densities are desirable.
(6) N® = Philadelphia Quartz brand sodium silicate solution, a solution of sodium silicate in water. Sufficient N® diluted with water is added to give a mixture of 100 parts perlite, 5 parts sodium silicate and 35 parts water.

TABLE II

SODIUM SILICATE COATED FILTERAIDS (1)

| Sample | Kiln Temp. ° F | PFR (4) | PCD (5) | % Water Solubility | % Sugar (6) Clarity |
|---|---|---|---|---|---|
| 436 (7) starting material | — | 55 | 15.6 | 0.03 | 59 |
| 436+N (2)(11) | — | 150 | 13.6 | 0.43 | 22 |
| 436+N | 1100 | 182 | 12.7 | 0.07 | 19 |
| 436+N | 1300 | 181 | 12.7 | 0.06 | 22 |
| 436+N (3) | 1500 | 178 | 15.6 | 0.04 | 20 |
| 4156 (8) | — | 125 | 14.5 | 0.06 | 16 |
| 4200 (9) | — | 183 | 20.8 | 0.05 | 26 |
| 5000 (10) | — | 217 | 22.3 | 0.04 | 20 |

(1) Damp powder dried 800° F, calcined as shown and air classified to remove coarse grit.
(2) Damp powder dried 800° F and air classified to remove coarse grit.
(3) Severe adherence to kiln wall; unsuitable for commercial operation.
(4) See Table I
(5) See Table I
(6) A measure of filteraids efficiency in removing filterable solids from a 60° Brix raw sugar solution. High percentages indicate higher filteraid clarification efficiency.
(7)(8) Dicalite® brand perlite filteraids, distributed by Grefco, Inc., a commercial high flowrate perlite filteraid.
(9)(10) Dicalite® brand diatomite filteraids, distributed by Grefco, Inc., a commercial high flowrate diatomite filteraid.
(11) See (6) in Table I

TABLE III

SODIUM SILICATE COATED FILTERAIDS (1)

| Sample | Air Classified-Fraction | Mean Particle (2) Size, μ | % Yield | PFR (4) | PCD (5) | % Sugar (6) Clarity |
|---|---|---|---|---|---|---|
| 436 (7) starting material | — | 23 | — | 55 | 15.6 | 73 |
| 436+N (11) | No | 37 | 99 | 186 | 13.1 | 30 |

TABLE III-continued

SODIUM SILICATE COATED FILTERAIDS [1]

| Sample | Air Classified-Fraction | Mean Particle [2] Size, μ | % Yield | PFR [4] | PCD [5] | % Sugar [6] Clarity |
|---|---|---|---|---|---|---|
| 436+N | Yes-Fine | 30 | 20 | 186 | 12.0 | [3] |
| 436+N | Yes-Coarse | 40 | 79 | 246 | 11.5 | 28 |
| 4156 [8] (perlite) | — | 44 | — | 125 | 14.5 | — |
| 4200 [9] (diatomite) | — | 18 | — | 183 | 20.8 | 34 |
| 5000 [10] (diatomite) | — | 25 | — | 217 | 22.3 | 30 |

[1] Damp powder dried at 1300° F, air classified as shown
[2] Determined by Coulter Counter
[3] Insufficient sample
[4]-[10] See Table II
[11] See [6] in Table I

TABLE IV

SODIUM SILICATE COATED FILTERAIDS [1]

| Sample | % Yield | PFR [3] | PCD [4] | % Sugar [5] Clarity | Mean Particle [2] Size, μ |
|---|---|---|---|---|---|
| 436 [6] | — | 55 | 15.6 | 73 | 23 |
| 436+N [9] | 99 | 186 | 13.1 | 30 | 37 |
| 476 [7] | — | 78 | 15.6 | 57 | 26 |
| 476+N | 99 | 191 | 14.8 | 32 | 35 |
| 4106 [8] | — | 110 | 16.0 | 34 | 45 |
| 4106+5% Sodium Silicate | 99 | 176 | 16.4 | 27 | 53 |

[1] Damp powder dried at 1300° F and air classified to remove coarse grit.
[2] Determined by Coulter Counter
[3]-[6] See Table I
[7]-[8] Dicalcite ® brand perlite filteraids.
[9] See [6] in Table I

What is claimed:

1. A process for producing an improved perlite filter aid which comprises mixing finely divided expanded perlite particles with an aqueous solution of alkali metal silicate to form a composition having perlite: alkali metal silicate: water in the ratio of about 100:1:5 to about 100:10:100, removing the free moisture and drying the mixture by suspending said composition in a moving gas stream at a temperature of from about 600° F to less than about 1400° F, whereby the perlite particles form dry agglomerates, and heat treating said dry agglomerates by indirect firing at about 1100° to about 1300° F to increase the water insolubility of the agglomerates.

2. The process of claim 1 wherein the ratio of perlite: alkali metal silicate: water ranges from about 100:2:15 to 100:8:50.

3. The process of claim 2 wherein the finely divided perlite particles are mixed with the alkali metal silicate to form a composition having the perlite: alkali metal silicate: water ratio of 100:5:35.

4. The process of claim 1 which comprises the further step of classifying the heat treated agglomerates by air separation.

5. The process of claim 1 wherein the finely divided perlite particles are mixed with the alkali metal silicate to form a composition having the perlite: alkali metal silicate: water ratio of 100:2:35.

6. The process of claim 4 wherein the finely divided perlite particles are mixed with the alkali metal silicate to form a composition having the perlite: alkali metal silicate: water ratio of 100:2:35.

* * * * *

UNITED STATES PATENT OFFICE
CERTIFICATE OF CORRECTION

Patent No. 4,064,071   Dated December 20, 1977

Inventor(s) John B. Gilmour et al.

It is certified that error appears in the above-identified patent and that said Letters Patent are hereby corrected as shown below:

[73] Assignee Grefco Inc., Bala Cynwyd, Pa.

between [56] and [57]

Attorney, Agent or Firm - Everett H. Murray, Jr.

Signed and Sealed this

Ninth Day of May 1978

[SEAL]

Attest:

RUTH C. MASON
Attesting Officer

LUTRELLE F. PARKER
Acting Commissioner of Patents and Trademarks